Dec. 18, 1928. C. S. BURTON Re. 17,165
OIL GUN
Original Filed Jan. 4, 1923
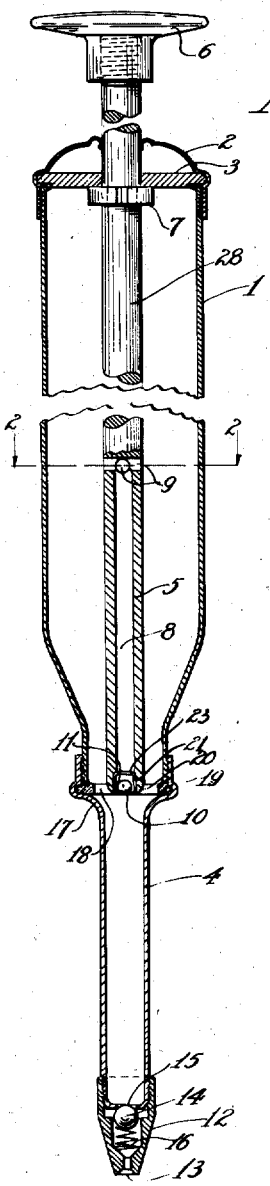
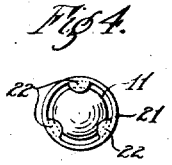
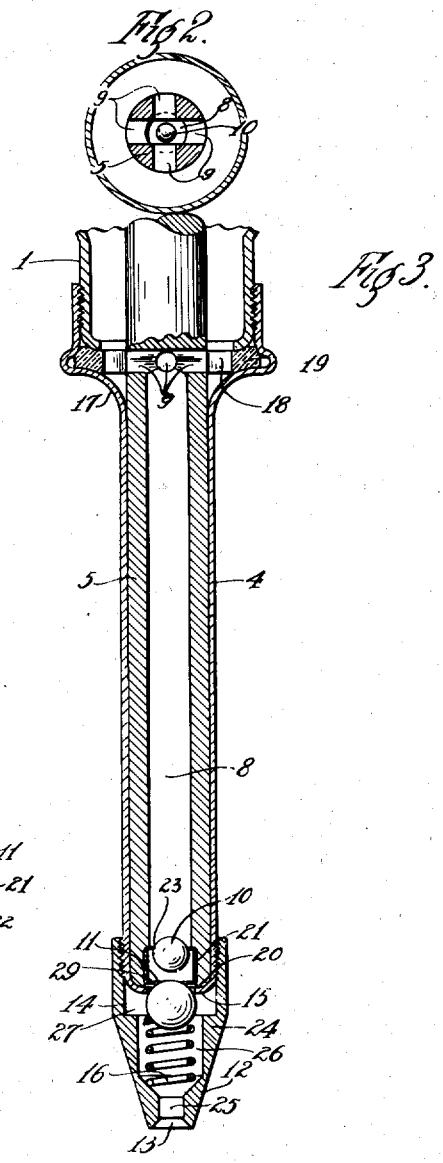
Witness.
H. O. McKnight
INVENTOR.
Charles S. Burton.
By Burton & Burton
his ATTORNEYS.

Reissued Dec. 18, 1928. Re. 17,165

UNITED STATES PATENT OFFICE.

CHARLES S. BURTON, OF OAK PARK, ILLINOIS, ASSIGNOR, BY MESNE ASSIGNMENTS, TO ALEMITE MANUFACTURING CORPORATION, OF CHICAGO, ILLINOIS, A CORPORATION OF DELAWARE.

OIL GUN.

Original No. 1,582,969, dated May 4, 1926, Serial No. 610,571, filed January 4, 1923. Application for reissue filed May 2, 1928. Serial No. 274,604.

The purpose of this invention is to provide a lubricant injecting device of the type commonly called an "oil gun" which shall be of simple construction and obvious mode of operation for forcing lubricant into the bearings of a mechanism such as an automobile. It consists in the elements and features of construction shown and described as indicated in the claims.

In the drawings:

Figure 1 is an axial section of a device embodying this invention with the piston member at withdrawn position;

Figure 2 is a detail section at the line 2—2 on Figure 1;

Figure 3 is an axial section of the device with the piston at in-thrust position; and Figure 4 is a detail inverted plan view of a valve cage for retaining a check valve in the piston.

The construction shown in the drawing comprises a cylindrical reservoir 1 for holding the lubricant, having a diametrically reduced end portion 4 constituting a pump cylinder whose discharge end is fitted with a nozzle member 24 conically tapered toward its extremity and having its discharge aperture 25 conically counterbored as shown at 13; the purpose of the conical formation exteriorly and interiorly being to adapt the nozzle to either enter and center itself in the oil inlet port of the bearing to be lubricated, or to center itself on the oil nipple which sometimes is provided at the oil inlet. The nozzle 15 is counterbored at 26 back of its discharge port to form a chamber for the spring 16, and back of said spring chamber it is further counterbored at 27 and interiorly threaded for screwing onto the end of the pump cylinder 4. Said pump cylinder 4 has its lower end inwardly flanged, as seen at 15, to afford a seat for the check valve 14 yieldingly held against that seat by the spring 16 in the chamber 26.

Mounted axially with respect to the reservoir 1 and pump cylinder 4 is a plunger 28 whose lower end portion 5 constitutes the pump piston being diametered to fit pistonwise in the pump cylinder member 4. Conveniently the plunger 28 is of the same diameter throughout its length and at its upper end it extends out through the cap 2 and guide bearing disc 3 which close the upper end of the reservoir 1, and above the reservoir it is provided with a knob 6 to serve as an operating handle suitably shaped for conveniently applying maximum manual pressure to drive the piston down into the pump cylinder 4. 7 is a stop collar on the plunger 28 for limiting the up-thrust or withdrawal movement.

The lower portion 5 of the plunger constituting the pump piston is axially bored at 8 from the lower end to a point which at the in-thrust position of the piston, shown in Figure 3, is just above the portion of reduced diameter which constitutes the pump cylinder as seen in Figure 3. And at this point, that is, the upper end of the bore 8, the piston is cross-bored, as shown at 9, to connect the axial bore outwardly with the chamber of the reservoir 1. At the lower end of the axial bore 8 of the piston member it is slightly counterbored to receive the valve cage 21 which is flanged at its upper end, as seen at 29, to afford a downwardly facing seat for the check valve 10 which is retained in the case by the lugs 22 at the lower end of the cage flexed inwardly after the ball is inserted, as seen in Figure 4.

The cap 2, carrying the guide bearing disc 3, is interiorly threaded for screwing into the upper end of the reservoir 1 and adapted to be unscrewed and withdrawn for filling the reservoir.

Upon considering the above described structure it will be understood that the reservoir 1 being filled with lubricant, the piston being at the time withdrawn to any convenient distance to permit the withdrawal of the cap sufficiently for obtaining access to the reservoir for filling it, and the cap having been replaced, the depression of the plunger to the limit of its stroke in the cylinder 4 will eject the air, if any, or the lubricant, if any, contained in the cylinder 4 prior to the filling operation; and that upon the retraction of the plunger, the valve 14 being seated and closing the inlet, a vacuum will be produced in the cylinder 4 below the withdrawing piston which will cause lubricant to be forced in through the cross ports 9 and axial bore 8, forcing out past the valve 10 any air or lubricant which may have been in the said bore at the beginning of the operation, so that at the end of the retracting movement of the piston its bore and the space below it in the cylinder 4 will be occupied with lubricant. Then upon the next in-thrust of the plunger the piston entering and traversing the cylinder 4 will force out the lubricant past the valve 14, the valve 10 in the end of the piston being in this movement seated upwardly so that the lubricant is not forced back into and through the bore of the piston. And it will be understood that by reason of the small diameter of the bore of the piston 5 and of the bore of the cylinder 4 very effective pressure can be produced by hand for driving the lubricant forceably into the bearings or oil circulatory system of the machine to be served by the device.

It will be further noted that at the extreme retracted position of the piston, shown in Figure 1, its lower end is above the upper end of the restricted bore of the cylinder 4. A purpose of this feature of construction is that if under any circumstances, such as clogging of the ports 9 or bore 8 of the piston, or jamming of the valve 10 in its seat, the entrance of lubricant through the ports 9 and down to the bore 8 and past the valve 10 in the retracting movement of the piston should be prevented or should occur deficiently, to the extent that the lubricant fails to enter by the course indicated into the bore of the cylinder 4, in the retracting movement of the piston, to which extent there will be produced by the retracting movement of the piston a partial vacuum in the bore of the cylinder 4; and, as seen, as the end of the piston has passed above the bore of the cylinder, which it fits closely, into the portion of larger diameter immediately thereabove, the lubricant in the chamber will be forced down into the cylinder bore to fill the vacuum created therein; and thus the cylinder will be filled ready for discharge of lubricant upon the next in-thrust of the plunger as it is designed to be filled through the ports 9 and bore 8 when this passage is unobstructed.

I claim:

1. A lubricant injector comprising a lubricant-holding barrel having a head at one end and at its discharge end a reduced portion of relatively small cross-section, a plunger extending axially through the barrel emerging through the head thereof for manual operation and at the inner end adapted to be thrust into the reduced portion fitting the same pistonwise for ejecting the lubricant, a discharge nozzle at the end of the reduced portion and an inwardly seating check valve in said nozzle adapted to open under the discharge pressure; the plunger having an axial bore and a port opening therefrom into the barrel back of the reduced terminal portion thereof when the plunger is at in-thrust position, and a valve in the axial bore seating in a direction opposite to the in-thrust lubricant-discharging movement of the plunger.

2. A lubricant injector of the class described comprising, in combination, a lubricant-holding barrel having a head at one end, a cylinder at the other end of said barrel, said cylinder of smaller cross section than said barrel and supplied with lubricant therefrom, a plunger reciprocable in said cylinder to discharge lubricant at high pressure, said plunger having a passage therethrough for establishing direct communication between said cylinder and said barrel, valve means for said passage to permit flow of lubricant therethrough in one direction only, and nozzle means connected to said cylinder and receiving the lubricant discharged therefrom, said nozzle affording a lubricant tight connection with a part to be lubricated.

3. A lubricant injector of the class described comprising, in combination, a lubricant-holding barrel, a cylinder axially aligned with said barrel and carried thereby, said cylinder of relatively small cross-section and supplied with lubricant from said barrel, a plunger reciprocable in said cylinder to discharge lubricant therefrom at relatively high pressure, said plunger having a passage therethrough directly connecting said cylinder with said barrel, means in said passage for preventing reverse flow of lubricant therethrough, nozzle means carried by said cylinder, said nozzle means for establishing a lubricant-tight seal with a receiving nipple when pressed thereagainst, and a handle for operating said plunger and creating a seal between said nozzle and a receiving nipple.

In witness whereof, I hereunto subscribe my name, this 26th day of April, 1928.

CHARLES S. BURTON.